No. 765,802. PATENTED JULY 26, 1904.
S. B. WISE.
WATER RECOVERING APPLIANCE FOR PLACER MINING MACHINES.
APPLICATION FILED JULY 11, 1903.
NO MODEL.
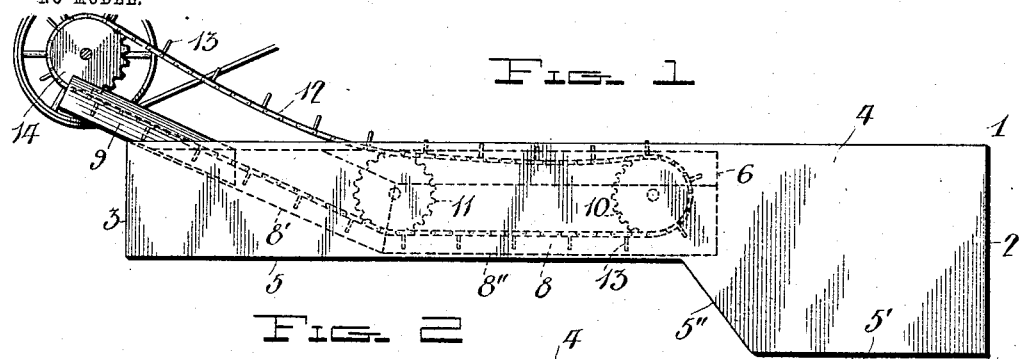
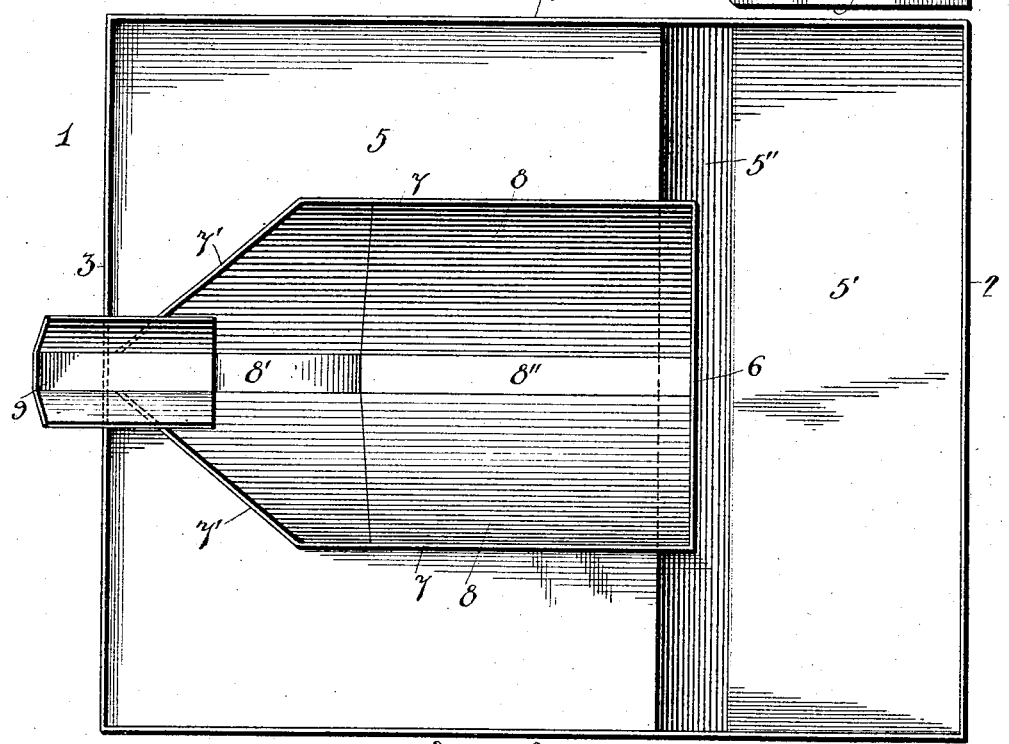
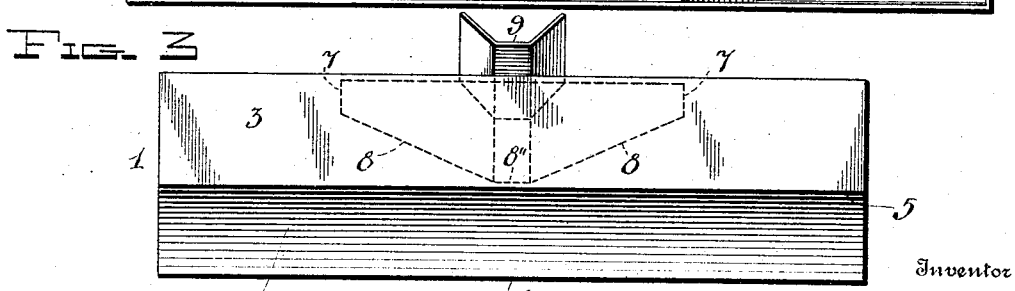
Witnesses
Inventor
S. B. Wise
By his Attorney No. 765,802.

Patented July 26, 1904.

UNITED STATES PATENT OFFICE.

SAMUEL B. WISE, OF WHITEOAKS, TERRITORY OF NEW MEXICO.

WATER-RECOVERING APPLIANCE FOR PLACER-MINING MACHINES.

SPECIFICATION forming part of Letters Patent No. 765,802, dated July 26, 1904.

Application filed July 11, 1903. Serial No. 165,048. (No model.)

*To all whom it may concern:*

Be it known that I, SAMUEL B. WISE, a citizen of the United States, residing at Whiteoaks, in the county of Lincoln and Territory of New Mexico, have invented new and useful Improvements in Water-Recovering Appliances for Placer-Mining Machines, of which the following is a specification.

This invention, which relates to placer-mining operations, is directed to the production of a cleaning and settling tank adapted for employment in the mining-machine which forms the subject-matter of an application for patent filed by me July 11, 1903, Serial No. 165,049.

The nature of the present invention will be readily comprehended in its various details of construction and operation, reference being had to the following description and to the accompanying drawings.

In the drawings, Figure 1 is a side elevation of a cleaning and settling tank embodying my invention. Fig. 2 is a plan view, and Fig. 3 an end view, of the tank, the conveyer being omitted.

Referring to the drawings by numerals, 1 designates what I term the "main" tank, which has a front wall 2, a rear wall 3, sides 4 4, and a bottom 5. The depth of the tank is increased at the front end, the bottom 5' at this portion of the tank being considerably lower than the bottom 5, to which latter it is connected by a sloping or inclined bottom portion 5''.

Supported within the shallower portion of the main tank and centrally relatively to its width is an inner tank having a straight front wall 6, sides 7 7, and a bottom 8, which latter toward the rear end inclines upwardly, as at 8', and meets converging side portions 7' 7', and said bottom throughout slopes from each side to a central longitudinally-disposed straight bottom section 8'', as shown more particularly by the dotted lines in Fig. 3. Projecting from the rear end of both tanks and forming a continuation of the inclined bottom portion 8' of the inner tank is a trough 9, which conforms cross-sectionally to the form of the bottom portion on which it rests.

Mounted to rotate in suitable bearings in the straight bottom portion of the inner tank are sprocket-wheels 10 11, around which is passed an endless chain 12, carrying transversely-disposed blades 13 13, conforming in length substantially to the width of the bottom section 8'', over which they move in their lower traverse with but slight clearance. The chain also passes over a sprocket-wheel 14, driven from a source of power, (not shown,) and said drive sprocket-wheel is positioned to cause the chain in its lower traverse to travel approximately parallel to the inclined bottom portion.

In operation the water and the material from which has been separated the valuable particles are delivered into the inner tank, where settling of the material takes place, the accumulations being carried by the traveling blades out of the inner tank and over the upper end of the projecting trough, from which point it is conveyed away in any preferred manner. The water, free from the material, overflows from the inner tank into the main tank, where complete settling of any remaining material is effected. The main tank is of sufficient capacity to allow of the accumulation of a considerable body of clear water, which is added to from time to time from an extraneous source to compensate for loss by evaporation and other causes.

It will be understood by reference to my other application before noted that the separation and cleaning of the ore is accomplished by the use of water, and it is to save this water and permit of its reuse that I provide the present means. As the result of the operation there is constantly on hand for utilization a considerable body of clear water, which is pumped or otherwise elevated from, preferably, the deeper portion of the main tank.

I claim as my invention—

1. An apparatus for recovering, clarifying. and storing water used in wet-process ore-separators, comprising a settling-tank, which receives water and suspended matter discharged from a separator, having side and end walls and a bottom sloping downward from the side walls to a central channel having an inclined part extending over the rear wall of the tank, an endless blade conveyer movable in the channel of the tank throughout its length to remove precipitated matter therefrom, and a main tank inclosing the settling-tank and having its end and side walls extended above those of said settling-tank.

2. An apparatus for recovering, clarifying and storing water used in wet-process ore-separators comprising a main tank having a bottom portions of which are at different levels, a settling-tank receiving water and suspended matter discharged from a separator, said tank located within the shallower part of the main tank and having side and end walls terminating below the tops of the side and end walls of the main tank and a bottom sloping downward from the side walls to a central channel having an inclined part extending to the top of the rear wall thereof, a trough extending from the upper end of the channel over the rear wall of the main tank, and an endless blade conveyer movable through the channel and trough to remove precipitated matter from the settling-tank.

In testimony whereof I have signed my name to this specification in the presence of two subscribing witnesses.

SAMUEL B. WISE.

Witnesses:
GEO. E. SLIGH,
FRANK J. SAGER.